May 25, 1943.　　　　D. G. HALL　　　　2,320,128
APPLIANCE FOR MIXING AND DISTRIBUTING LIQUID
DISINFECTANTS OR OTHER FLUIDS
Filed Nov. 10, 1941
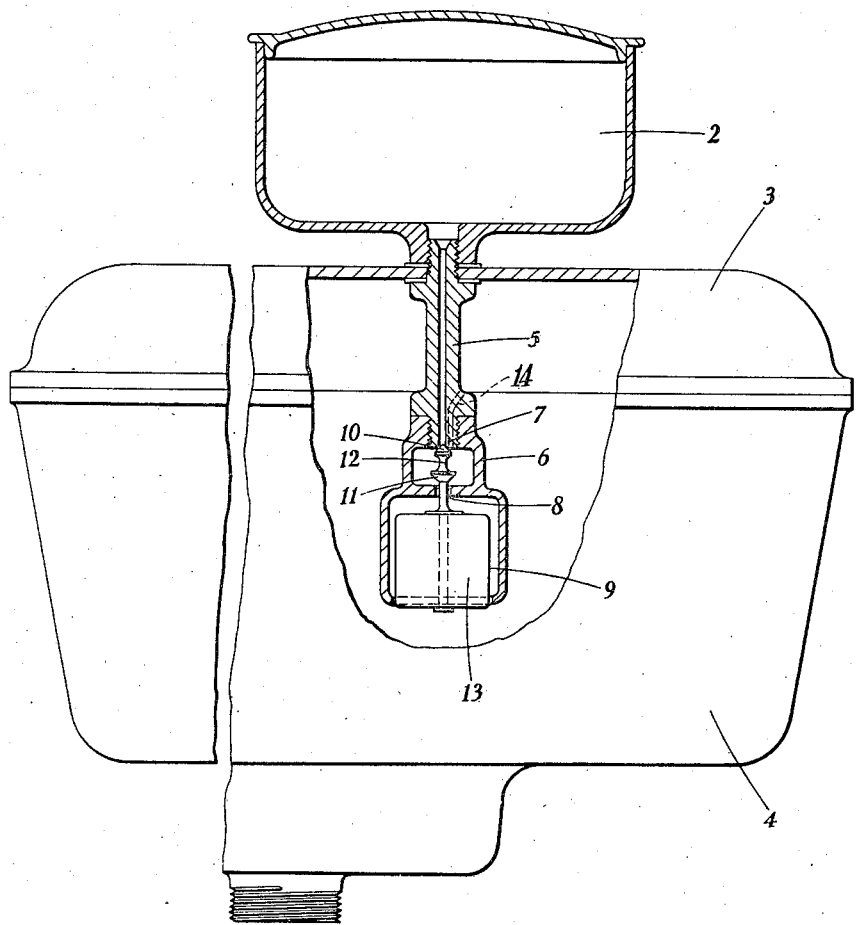
David George Hall INVENTOR
BY
Singer, Ehlert, Stern & Carlberg
ATTORNEYS Patented May 25, 1943

2,320,128

UNITED STATES PATENT OFFICE 2,320,128

APPLIANCE FOR MIXING AND DISTRIBUTING LIQUID DISINFECTANTS OR OTHER FLUIDS

David George Hall, Newport, England

Application November 10, 1941, Serial No. 418,614
In Great Britain February 15, 1940

1 Claim. (Cl. 4—227)

This invention relates to appliances for the automatic measurement, dilution and distribution of concentrated liquid disinfectant or other fluids such as insecticides, of the type comprising a reservoir for the concentrated liquid having a discharge conduit to lead such liquid by gravity flow to a valve-controlled inlet of a measuring chamber, which chamber also has a valve-controlled outlet leading to a cistern, storage chamber or the like (hereinafter termed "cistern") for the liquid to receive the concentrated liquid and form its dilutant and further in which the inlet and outlet valves of the measuring chamber are connected to move as one and so arranged that when the outlet valve is closed the inlet valve is open, and vice versa, their position being directly controlled by a float located thereunder and connected to the valves by a common vertical stem, the float being subject to the action of the liquid in the cistern and the whole being so mounted and disposed that the inlet valve is closed and the outlet valve opened before the cistern is full.

In accordance with the present invention, a cage is provided in which the under-positioned float is located and guided and into which the outlet from the measuring chamber opens; further such cage may be formed integrally with the body of the measuring chamber.

In order that the invention may be better understood it will now be described with reference to the accompanying drawing the single figure of which shows an elevation partly in section of a flushing cistern fitted with one constructional embodiment of an appliance according to the invention.

According to this embodiment, 2 is a reservoir for the concentrated liquid (for example liquid disinfectant) of any convenient shape or capacity, superimposed on the lid 3 of a cistern 4, such as in general use for the flushing of water closets. The reservoir 2 is provided with a gravity-flow discharge pipe 5 which as shown passes through the lid 3 and by inter-engaging screwed portions is firmly secured to the lid.

The pipe 5 depends into the interior of the body of the cistern 4 to a suitable depth and a measuring chamber 6 is attached to its lower extremity, the inlet 7 to the chamber 6 being formed by the opening at the lower end of the pipe 5. 8 is on outlet from the chamber 6 communicating with the interior of a cage 9 formed in one with (as shown) or attached to the measuring chamber 6.

This chamber 6 is provided with inlet and discharge valves 10 and 11 respectively. The seating for the inlet valve 10 is formed by the inlet 7 and the seating for the discharge valve 11 is formed by the outlet 8 in the lower wall of the measuring chamber 6. These valves 10 and 11 have a spindle 12 which is common to both, so that they rise and fall in unison; further, the spindle extends below the valve 11 where it carries a float 13 which controls the opening and closing of the valves by direct action. The float 13 is accommodated and guided in and by the cage 9 in such a manner that when the concentrated liquid passes to the interior of the cage is has unhindered passage to the cistern 4. Moreover, the float is so disposed that it is adapted to close the inlet valve 10 and open the outlet valve 11 before the cistern 4 is full of water.

In action, the inlet valve 10 is opened when the cistern 4 is empty and in this position the outlet valve 11 is held upon its seating 8 by the combined weight of the valves, spindle and float. As a consequence, the liquid disinfectant is thus free to pass from the reservoir 2 to the measuring chamber 6 where it is retained. As before explained, the disposition of the float 13 is such that it closes the inlet valve 10 and opens the discharge valve 11 from the measuring chamber 6 before the cistern 4 is full of water, thereby ensuring a perfect admixture of the disinfectant with the water by the agitation set up by the flow of water through the ball or other inlet valve of the cistern (not shown) during the final stages of filling the cistern. This is the position shown in the drawing.

In accordance with another embodiment of the invention, a portable apparatus can be employed for the measurement, dilution and distribution of other liquids such as insecticides and structurally such apparatus is provided with the fitments as above described in co-operation with a tank of suitable dimensions for the water in place of a cistern.

In some cases where required a vent hole is provided from the measuring chamber above the normal height of the fluid in the cistern, tank or the like, to prevent any possibility of an air lock in the measauring chamber. Such a construction is shown by the numeral 14 to indicate the conduit shown in dotted lines from the measuring chamber to a position in the pipe 5 which would come above the normal level of the liquid in the tank.

What I claim and desire to secure by Letters Patent of the United States of America is:

In a device of the character described, the combination with a cistern having a removable cover, of a reservoir for disinfectant secured to the outside of the cover of the cistern, a pipe fixed to the reservoir and cover and extending downward into the cistern, a measuring chamber secured to the lower end of the pipe and having a valve controlled inlet to the pipe at the top and a valve controlled outlet at the bottom, valves in the interior of the measuring chamber, a spindle movable through said outlet and to which the valves are rigidly secured, and a float fixed to the lower end of the spindle and vertically movable in the cistern over a shorter distance than the difference in the levels of the liquid when the cistern is filled and discharged respectively, the measuring chamber being provided with a venting passage continuously open at one end to the interior of the cistern above the upper level of the liquid therein and continuously open at the lower end to the interior of the measuring chamber.

DAVID GEORGE HALL.